United States Patent
Bose et al.

(10) Patent No.: US 11,182,674 B2
(45) Date of Patent: Nov. 23, 2021

(54) MODEL TRAINING BY DISCARDING RELATIVELY LESS RELEVANT PARAMETERS

(71) Applicant: International Business Machines Corporation, Armonk, NY (US)

(72) Inventors: Pradip Bose, Yorktown Heights, NY (US); Alper Buyuktosunoglu, White Plains, NY (US); Augusto J. Vega, Mount Vernon, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 767 days.

(21) Appl. No.: 15/461,643

(22) Filed: Mar. 17, 2017

(65) Prior Publication Data
US 2018/0268290 A1 Sep. 20, 2018

(51) Int. Cl.
*G06N 3/08* (2006.01)
(52) U.S. Cl.
CPC ................. *G06N 3/082* (2013.01)
(58) Field of Classification Search
None
See application file for complete search history.

(56) References Cited

U.S. PATENT DOCUMENTS

| | | | |
|---|---|---|---|
| 8,862,522 B1 | 10/2014 | Jaiswal et al. | |
| 8,996,530 B2 | 3/2015 | Luvogt et al. | |
| 9,158,370 B2 | 10/2015 | Denker et al. | |
| 9,336,483 B1* | 5/2016 | Abeysooriya | G06N 3/08 |
| 10,152,676 B1* | 12/2018 | Strom | G06N 20/10 |
| 2012/0078917 A1* | 3/2012 | Gradin | G06F 16/23 707/748 |
| 2015/0254555 A1 | 9/2015 | Williams, Jr. et al. | |
| 2019/0197404 A1* | 6/2019 | Wang | G06N 3/0454 |

OTHER PUBLICATIONS

Giraud-Carrier, Christophe; "A Note on the Utility of Incremental Learning"; Ai Communications; vol. 13, Issue 4, (2000), 215-223 pages.
ip.com: "An Enhanced Predictive and Analytics Model for Collaboration"; Anonymously; Nov. 5, 2015; 4 pages.
ip.com: "Cognitive Help for Software Applications and System"; Anonymously; Dec. 9, 2015; 4 pages.
Xiao, Tianjun, et al.,; "Error-Driven Incremental Learning in Deep Convolutional Neural Network for Large-Scale Image Classification"; ACM Multimedia; Nov. 1, 2014; 177-186 pages.

* cited by examiner

*Primary Examiner* — Daniel T Pellett
(74) *Attorney, Agent, or Firm* — Cantor Colburn LLP; Vazken Alexanian (57) ABSTRACT

Embodiments of the present invention include a system, computer-implemented method, and a computer program product. A non-limiting example of the method includes a processor utilizing a model having a plurality of parameters. The processor compares a current value of a model parameter to a prior value of the model parameter. Based at least in part on comparing the current value of the model parameter to the prior value of the model parameter, a determination is made that the model being utilized by the processor has changed. The current value of the model parameter is transmitted by the processor.

17 Claims, 5 Drawing Sheets

MODEL TRAINING BY DISCARDING RELATIVELY LESS RELEVANT PARAMETERS

STATEMENT REGARDING FEDERALLY SPONSORED RESEARCH OR DEVELOPMENT

This invention was made with Government support under Contract No.: HR0011-13-C-0022 awarded by Defense Advanced Research Projects Agency (DARPA). The Government has certain rights in this invention.

BACKGROUND

The present invention relates in general to cognitive models, and more specifically, to methods, systems and computer program products for training a cognitive model in a deep learning environment by discarding relatively less relevant parameters.

SUMMARY

Some embodiments of the present invention are directed to a computer-implemented method. A non-limiting example of the computer-implemented method includes a processor utilizing a model having a plurality of parameters. The processor compares a current value of a model parameter to a prior value of the model parameter. Based at least in part on comparing the current value of the model parameter to the prior value of the model parameter, a determination is made that the model being utilized by the processor has changed. The current value of the model parameter is transmitted by the processor.

BRIEF DESCRIPTION OF THE DRAWINGS

The foregoing and other features and advantages of the invention are apparent from the following detailed description taken in conjunction with the accompanying drawings, in which.

DETAILED DESCRIPTION

It is understood in advance that although this detailed description includes a description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Turning now to an overview of technologies that are more specifically relevant to aspects of the present invention, in the context of deep machine learning, training of a cognitive model is typically the most time consuming and processing intensive task. The cognitive model can be, for example, an artificial neural network, such as a deep neural network (DNN), a convolutional neural network (CNN), a deep belief network (DBN), or other type of model. The cognitive model can be used in a variety of applications, including, for example and without limitation, automatic speech and facial recognition, image processing, natural language processing, computer vision, and other applications which, in general, require a learning representation over time of sensed, observed, and/or otherwise generated data. The model typically includes multiple input and output layers, and a number of (oftentimes hidden) processing layers in-between. The layers ("neurons") can be cascaded for nonlinear processing of the data for, e.g., feature extraction and processing. Thus, model learning typically takes place in a continuous (incremental) manner over time as new input data (e.g., new classes of model input data) are generated. An overall goal is to adequately train the model to achieve relatively accurate prediction of future data and/or events.

Model training typically is not carried out on mobile devices (e.g., smartphones, tablets, automobiles, robotics, and wearable devices). This often results from mobile processing resource constraints. One (non-limiting) example solution is to offload (part or all of) the model training process to one or more powerful computer(s) (i.e., with greater processing capability), such as one or more computers located in a cloud computing environment (e.g., that of computing environment 50 in FIG. 1), or a stand-alone computer with enough processing capability (e.g., that of the processors 101 of the system 100 of FIG. 3, described in more detail below). By way of further example (only), the cloud computer(s) or the stand-alone computer can have a "base" or "reference" version of the model running thereon, while a "remote" version of the same model can be running on the mobile device. In this example, the cloud computer(s) or the stand-alone computer alone could perform training of the base version of the model, while the mobile device would not perform any model training but instead would perform various inference activities (e.g., classification, recognition) that are common to such a model in a deep learning environment.

One issue becomes how to update (in a communication bandwidth-aware and timely manner) the parameters of the remote model located in the one or more mobile devices with new or updated model parameter values or weights generated by the cloud computer(s) or stand-alone computer following training of the base model (e.g., after a model training iteration, sometimes referred to as an epoch). In some embodiments, the update is incremental, dynamic, and only relevant parameters (e.g., updated relevant parameter values or weights) are communicated from the cloud computer(s) or stand-alone computer to the mobile device. The various then-current parameter values or weights in the remote model of the mobile device can be overwritten with the updated (communicated) parameter values or weights.

Nevertheless, the number of parameters having their values or weights updated at any one time (e.g., after a base model training iteration or epoch) can also be problematic from a wireless communication bandwidth standpoint. This is because there can be thousands or hundreds of thousands of updated parameter values or weights available at any one time. The issue (in such a wireless environ) can then focus on which updated parameter values or weights to selectively send or communicate over the wireless bandwidth-limited communication channel, e.g., from the cloud computer(s) or stand-alone computer to the mobile device. Such selective updating may also consider the potential impact to the accuracy of the remote model.

By selectively updating the values or weights of a subset of the parameters in a base model, a base model e.g., on the cloud computer(s) or stand-alone computer can be expected to have a greater number of update parameter values or weights than that of the corresponding remote model. It is desirable that, as the model updates or evolves over time, the version of the remote model be as accurate as possible as compared to the base model. Embodiments of the present invention relate to the dynamic determination of the relevance of the updated parameter values or weights to be communicated to a mobile device.

Figure 1:
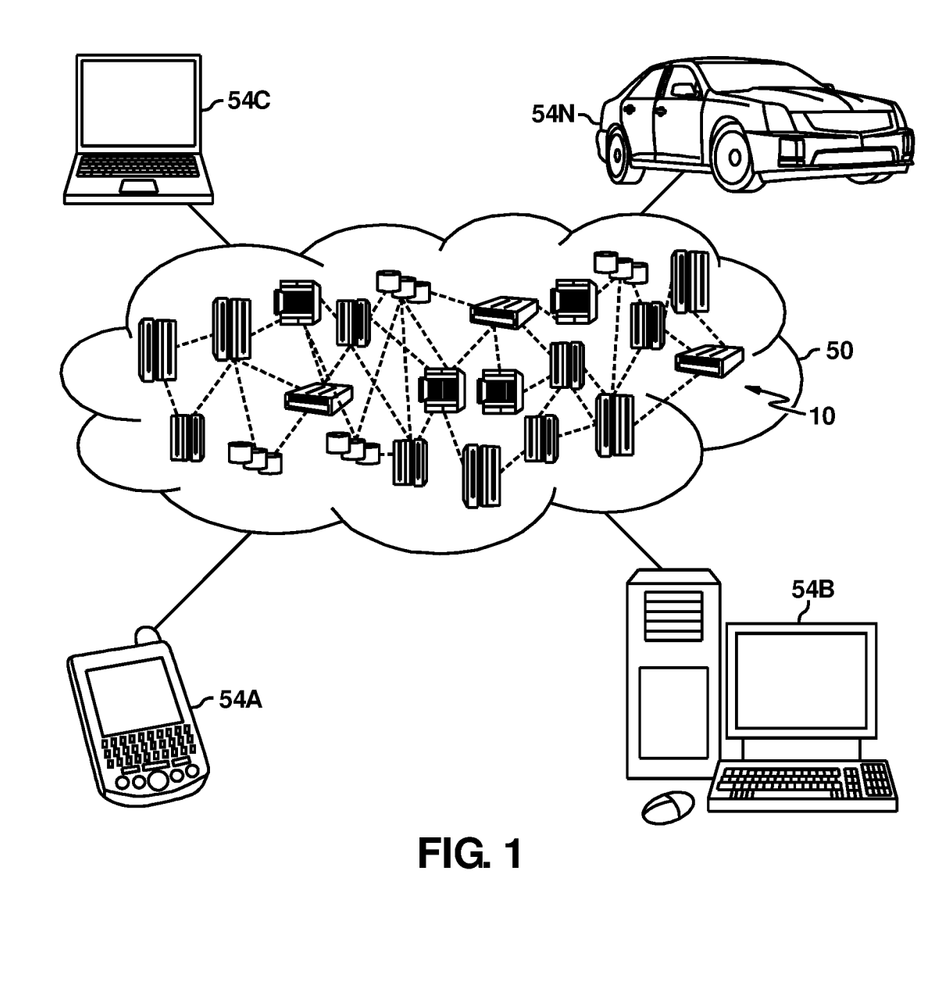
FIG. 1 depicts a cloud computing environment according to one or more embodiments of the present invention.

FIG. 1 illustrates an exemplary cloud computing environment 50 in accordance with the present invention. As shown, cloud computing environment 50 comprises one or more cloud computing nodes 10 with which local computing devices used by (remotely-located) cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
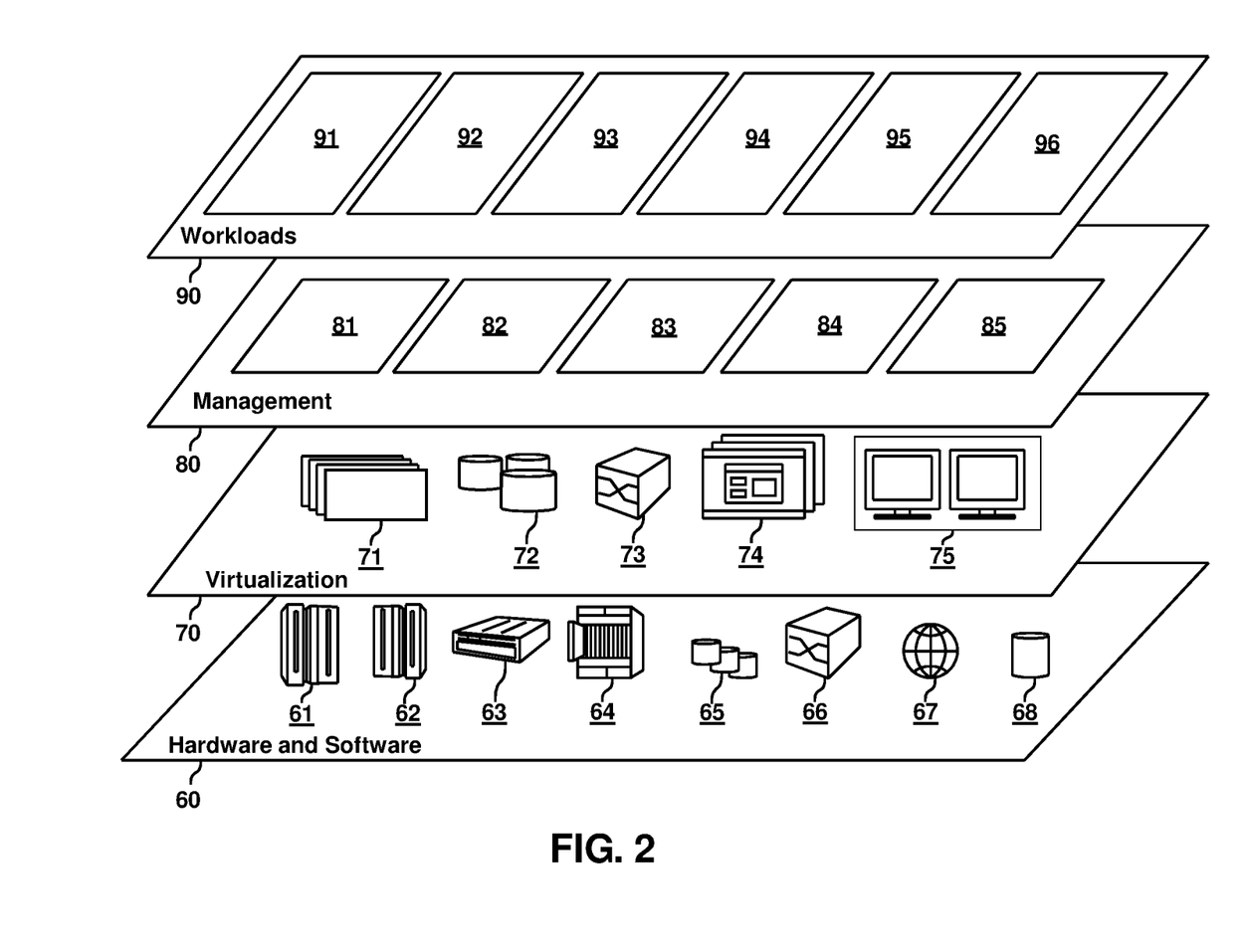
FIG. 2 depicts abstraction model layers according to one or more embodiments of the present invention.

FIG. 2 depicts an exemplary set of functional abstraction layers that can be provided by cloud computing environment 50 (FIG. 1), according to one or more embodiments of the present invention. It should be understood in advance that the components, layers, and functions shown in FIG. 2 are intended to be illustrative only and embodiments of the invention are not limited thereto. As depicted, the following layers and corresponding functions are provided:

As depicted in FIG. 2, hardware and software layer 60 includes hardware and software components. Examples of hardware components include: mainframes 61; RISC (Reduced Instruction Set Computer) architecture based servers 62; servers 63; blade servers 64; storage devices 65 (e.g., database(s) or mass data store(s)); and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for updating a base version of a model and communicating a relevant subset of the updated base model parameter values or weights to a remote device running or utilizing the model, in accordance with one or more embodiments of the present invention.

Figure 3:
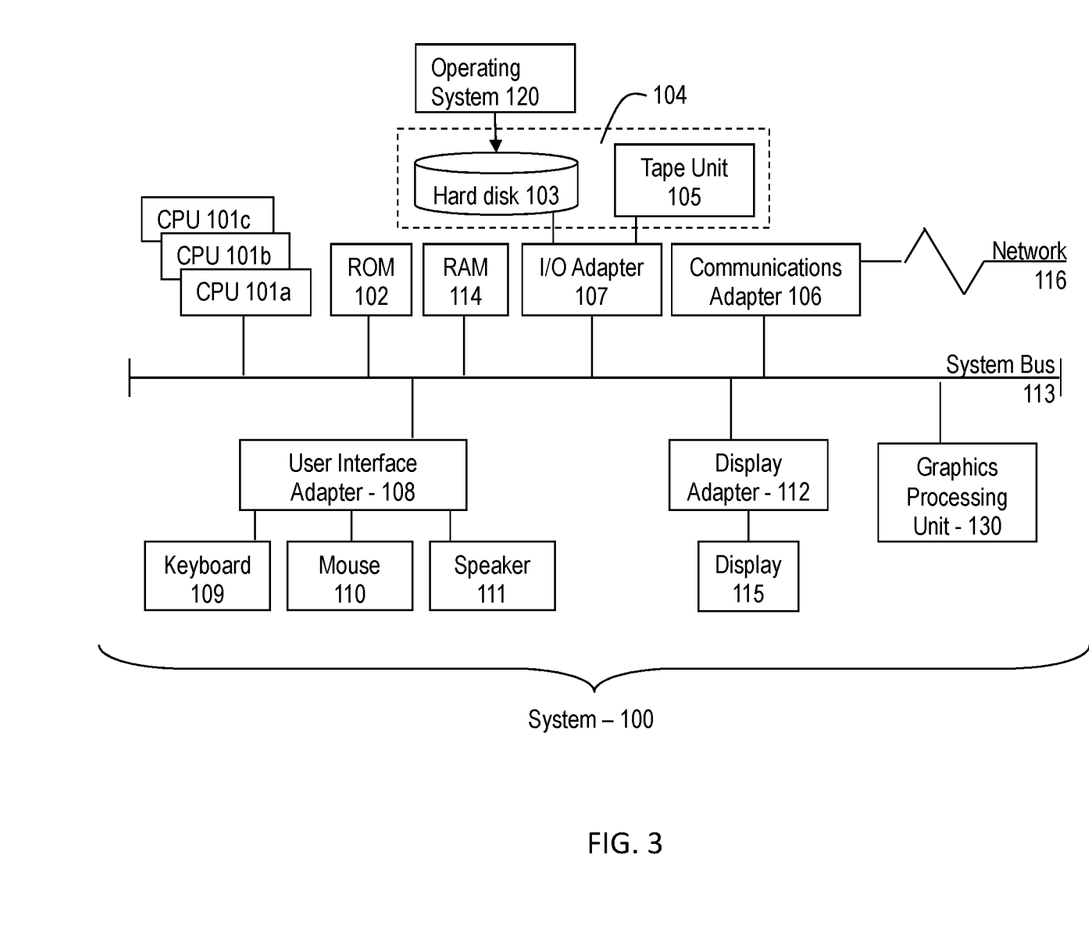
FIG. 3 is a block diagram illustrating one example of a system according to one or more embodiments of the present invention.

FIG. 3 depicts a system 100 according to one or more embodiments of the present invention. In some embodiments, the system can be part of the cloud environment depicted in FIG. 1. As depicted in this example, system 100 is a "stand-alone" system that includes one or more central processing units (CPUs) 101*a*, 101*b*, 101*c*, etc. (collectively or individually referred to as processor(s) 101). In some embodiments, processor(s) 101 can include a reduced instruction set computer (RISC) microprocessor. Processors 101 are coupled to memory (e.g., RAM 114) and various other components via a system bus 113. Read only memory (ROM) 102 is also coupled to the system bus 113 and can include a basic input/output system (BIOS) (not depicted), which controls certain basic functions of system 100.

System 100 further includes an input/output (I/O) adapter 107 and a network adapter 106 coupled to the system bus 113. I/O adapter 107 can be a small computer system interface (SCSI) adapter that can communicate with a hard disk 103 and/or tape storage drive 105 or any other similar component. Mass storage 104 memory devices include (for example and without limitation) hard disk 103 and tape storage device 105. Operating system 120 for execution on the processing system 100 can be stored in mass storage 104.

A network adapter 106 interconnects bus 113 with an outside network 116 enabling data processing system 100 to communicate with other such systems or with remote devices (e.g., a personal digital assistant (PDA), cellular telephone or smartphone, desktop computer, laptop computer, automobile computer system, robot or a wearable device—similar to those devices depicted in FIG. 1), where the remote devices run or utilize models similar to the models being run by or utilized on the processor(s) 101 in the system 100. A screen (e.g., a display monitor) 115 is connected to system bus 113 by display adaptor 112, which can include a graphics adapter to improve the performance of graphics intensive applications and a video controller. In one embodiment, adapters 107, 106, and 112 can be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108. A keyboard 109, mouse 110, and speaker 111 all interconnected to bus 113 via user interface adapter 108, which can include, for example, a super I/O chip, which integrates multiple device adapters into a single integrated circuit.

System 100 can also include a graphics processing unit 130. Graphics processing unit 130 is a specialized electronic circuit designed to manipulate and alter memory to accelerate the creation of images in a frame buffer intended for output to a display. In general, graphics processing unit 130 is more efficient at manipulating computer graphics and image processing than general-purpose CPUs, and can have a highly parallel structure that can make it more effective than general-purpose CPUs for processing of large blocks of data in parallel.

Thus, as depicted in FIG. 3, the system 100 includes processing capability in the form of processors 101, memory/storage capability (including RAM 114, ROM 102 and mass storage 104), input devices such as keyboard 109 and mouse 110, and output devices such as speaker 111 and display 115. In one embodiment, a portion of RAM 114 and mass storage 104 collectively store an operating system 120, which coordinates the various functions of components shown in FIG. 3.

By way of overview, aspects of the present invention include features for updating a base version of a model (e.g., residing in system 100) in a deep learning environment and communicating (e.g., via network 116) a relevant subset of updated model parameter values or weights to a remote device (e.g., those in FIG. 1) also running the model. In some embodiments, a processor utilizes a model having a plurality of parameters. In some embodiments, the processor compares a current value of a model parameter to a prior value of the model parameter. Based at least in part on comparing the current value of the model parameter to the prior value of the model parameter, a determination is made that the model being utilized by the processor has changed. In some embodiments, the current value of the model parameter is transmitted by the processor.

Figure 4:
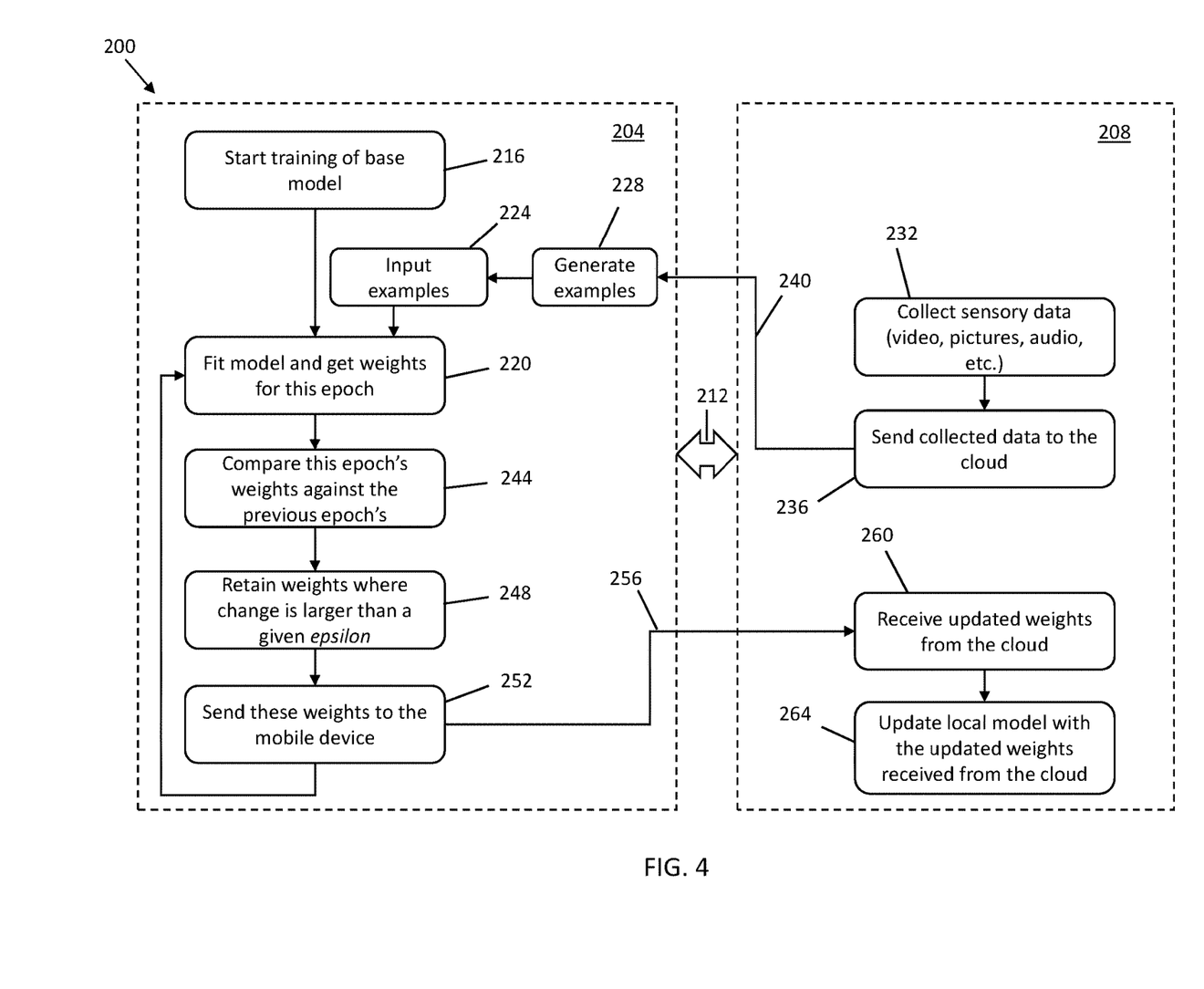
FIG. 4 illustrates one example of a method according to one or more embodiments of the present invention.

FIG. 4 depicts an example process, according to one or more embodiments of the present invention. Some embodiments of the process include a base or reference computer 204 and a mobile device 208. By way of example only, base or reference computer 204 can be the one or more computing nodes 10 of cloud computing environment 50 (FIG. 1), or the system 100 (FIG. 3), while mobile device 208 can be a personal digital assistant (PDA), cellular telephone or smartphone 54A, desktop computer 54B, laptop computer 54C, and/or automobile computer system 54N of FIG. 1, or other similar "remote" devices such as a robot or a wearable device. In this example, base computer 204 has the "base" or "reference" version of a cognitive model (300, FIG. 5) running or being utilized thereon, while a "remote" version of the same model 300 is running or being utilized on mobile device 208.

As depicted, base computer 204 and remote device 208 can be communicatively coupled by a connection 212 (e.g., a wireless (cellular, Bluetooth® and/or WiFi) connection and/or wired (Ethernet) connection). As described in more detail hereinafter, the base computer 204 and the remote device 208 communicate via connection 212.

According to some embodiments of the present invention, the base computer 204 alone performs the training of the base version of the cognitive model 300 (FIG. 5), while the mobile device 208 (does not perform any model training) but does use the model 300 to perform various inference activities (e.g., classification, recognition), where such activities are common to this type of model 300 in a deep learning environment. In one or more embodiments, model 300 may perform other (or additional) activities depending on the type of model and overall system in which it is used. In one or more computer-implemented method embodiments of the present invention, aspects of FIG. 4 can be embodied as software (i.e., program instructions) running on the base computer 204 and/or mobile device 208.

Figure 5:
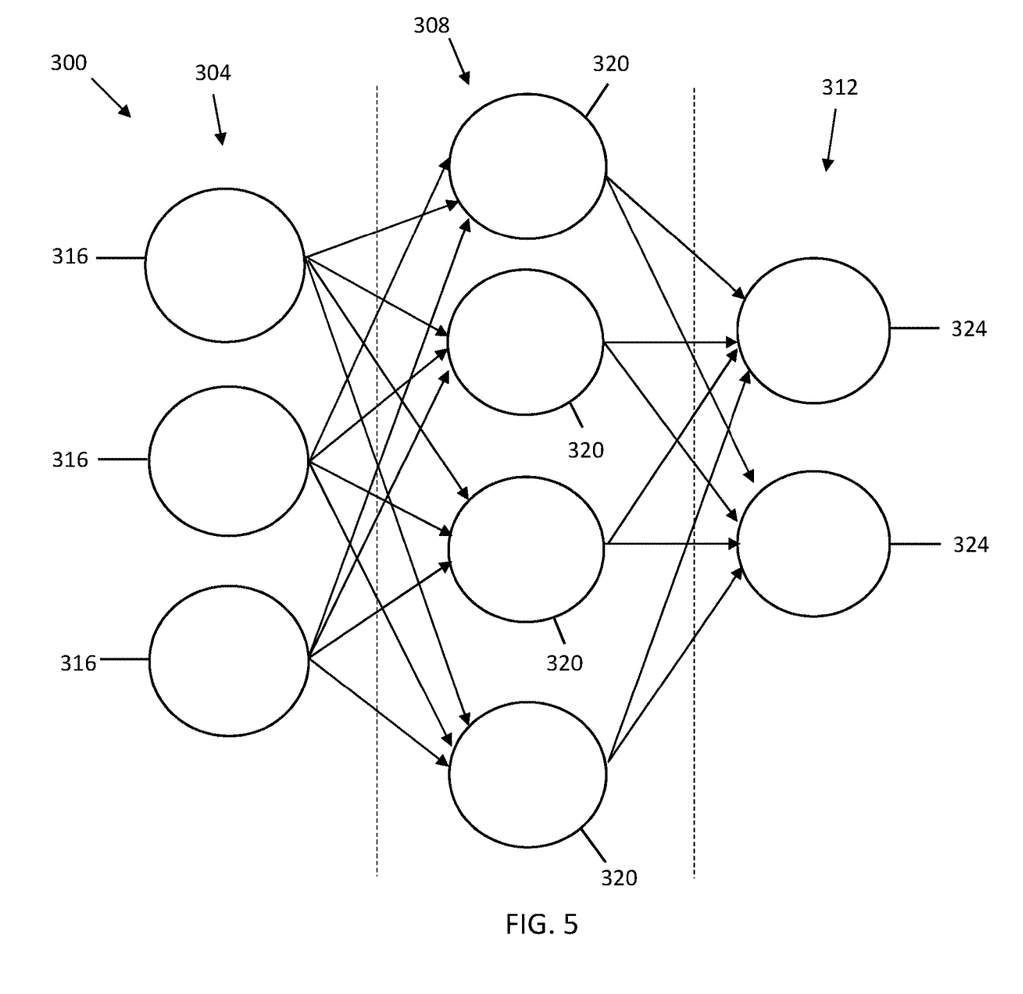
FIG. 5 is a diagram of a model according to one or more embodiments of the present invention.

FIG. 5 depicts an exemplary embodiment of a cognitive model 300 utilized in conjunction with the process 200 of FIG. 4. In one or more embodiments of the present invention, model 300 can be embodied as software running on base computer 204 and/or mobile device 208.

With reference now to FIG. 5, cognitive model 300 can be, for example, an artificial neural network such as, for example, one of a deep neural network (DNN), a convolutional neural network (CNN), a deep belief network (DBN), or other type of model. The cognitive model 300 can be used in a variety of applications, including, for example and without limitation, automatic speech and facial recognition, image processing, natural language processing, computer vision, and other applications which, in general, require a learning representation over time of sensed, observed, and/or otherwise generated data. In exemplary embodiments, the cognitive model 300 can include multiple input layers 304, multiple processing layers 308 (sometimes hidden), and multiple output layers 312. However, other layers are possible. The layers 304, 308, 312 can be cascaded for nonlinear processing of the data for, e.g., feature extraction and processing, or for other purposes.

Each input layer 304 includes multiple nodes or neurons 316. Similarly, each processing layer 308 includes multiple nodes 320, and each output layer 312 includes multiple nodes 324. FIG. 4 is representative of a relatively small portion of the overall cognitive model 300, including the exemplary connectivity of the nodes 316, 320, 324, as between the layers 304, 308, 312.

As is known, a model 300 such as a neural network performs various computational activities using a number of parameters depending on the specific application or intended usage of the model 300. Each parameter has a value or weight that typically changes depending on sensed or observed values or weights of the parameters and any calculations by the model 300 using those values or weights. Given a particular task to solve and a class of functions, the model 300 learns by repeatedly using a set of observations (e.g., sensed, observed or otherwise generated data) to find a function to solve the task in a relatively optimal sense.

Referring now to FIG. 4, in an operation 216, base computer 204 begins training of a base (or reference version of) the model located on base computer 204. In some embodiments, the training can use as the initial data, for example, fixed data values or weights from an existing or prior version of the base model (e.g., model 300, FIG. 5). In some embodiments, the initial training data can include other available parameter values or weights.

Referring now to FIG. 4 and FIG. 5, in operation 220, a base model (running on base computer 204) is fitted with the initial values and/or weights of the various parameters of the model for the first iteration (or epoch) of the model. By way of preview only, for other than the initial training iteration (or epoch) of the base model, operation 220 can use parameter values or weights from one or more examples output from operation 224. The examples can be generated in an operation 228, and can include one or more sets of input features derived from data sensed, observed or otherwise generated by the mobile device 208 in an operation 232 and communicated in operation 236. For example, for an image processing application utilizing the model 300, various types of image data can be sensed, observed or otherwise generated in the operation 232, including for example and without limitation, video, audio, pictures, etc. The collected data can then be sent to the base computer (e.g., the cloud computer(s)) in an operation 236 on a signal line 240 that is a part of the wireless or wired connection 212.

In an operation 244, the values or weights of the various parameters of the model 300 on the base computer 204 for the current training iteration or epoch of the model 300 are compared to the values or weights of the parameters for the prior iteration or epoch of the model 300.

In an operation 248, the values or weights of the parameters that are, for example, larger than (or larger than or equal to) a given threshold or epsilon value are saved or retained. In an exemplary embodiment, the threshold or epsilon value represents an amount of difference between the value or weight of each parameter in a current training iteration or epoch of the model 300 on the base computer 204 as compared to the value or weight or each parameter in a prior (e.g., most recent or some other previous) training iteration or epoch of the model 300 on the base computer 204. In embodiments, the value for the threshold or epsilon can be fixed or can be dynamically changed in some manner. Also, according to embodiments of the present invention, the value for threshold or epsilon can be chosen primarily to determine which one or more of the parameters have had their values or weights change relatively significantly since the prior training iteration or epoch. As such, these parameter values or weights can be considered to have a relatively significant impact or effect on the model 300 (i.e., the version of the model 300 running on the mobile device 208). At the same time, those parameters that have their values or weights change less than the threshold value can be considered to not have a relatively significant impact or effect on the model 300. In embodiments, it is envisioned that a relatively small number of the overall number of parameters will have their values or weights change as between training iterations.

Thus, in an operation 252, the values or weights that have changed greater than a threshold value are sent or transmitted to the version of the model 300 running on the mobile device 208. At the same time, those parameters that have their values or weights change less than the threshold value are not sent to the model running or being utilized on the mobile device 208. The sent values or weights can be sent on a signal line 256 that is part of the connection 212. In an operation 260, the mobile device 208 receives the updated weights and, in an operation 262, the mobile device 208 updates the version of the model 300 running or being utilized on the mobile device 208 with these update weights. The "remote" version of the model 300 running or being utilized on the mobile device 208 utilizes the updated parameter values or weights when executing in its normal course.

As described, embodiments utilize a threshold evaluation of parameter weights or values as between training iteration or epochs to determine which parameter changed values or weights could have a relatively significant impact on the model 300 on the mobile device 208. However, other embodiments of the present invention contemplate having the model 300 on the mobile device updated with "new" or updated parameter values or weights that are not dependent or reliant on a threshold value. Instead, these updated parameter weights can be determined to have a relatively significant effect or impact on the model 300 running or being utilized on the mobile device based on a qualitative or quantitative measure over time of the learning of the model 300 running or being utilized on the mobile device 208.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   training, by a processor of a base computer, an artificial neural network model to update one or more of a plurality of parameters of the artificial neural network model on the base computer, wherein the plurality of parameters including a first parameter and a second parameter;
   comparing, by the processor, a first current value of the first parameter from a current training iteration to a first prior value of the first parameter from a prior training iteration and a second current value of the second parameter from the current training iteration to a second prior value of the second parameter from the prior training iteration;
   determining, by the processor, to transmit the first current value of the first parameter to a remote device based at least in part on comparing the first current value of the first parameter and the first prior value of the first parameter, wherein a change between the first current value and the first prior value of the first parameter is more than a threshold value;
   determining, by the processor, to not transmit the second current value of the second parameter to the remote device based at least in part on comparing the second current value of the second parameter and the second prior value of the second parameter, wherein a different change between the second current value and the second prior value of the second parameter is less than the threshold value; and
   transmitting, by the processor, the first current value of the first parameter to the remote device to update the first parameter of a version of the artificial neural network model that is implemented on the remote device but is not trained by the remote device.

2. The computer-implemented method of claim 1, wherein determining, by the processor, to transmit the first current value of the first parameter to the remote device further comprises determining, by the processor, a qualitative or quantitative measure over time of learning by the version of the artificial neural network model on the remote device.

3. The computer-implemented method of claim 1, wherein the threshold value is a fixed value.

4. The computer-implemented method of claim 1, wherein the threshold value is a changing value.

5. The computer-implemented method of claim 1, wherein the artificial neural network model is a deep neural network, a convolutional neural network, or a deep belief network.

6. The computer-implemented method of claim 1, wherein the processor is located in a cloud computing environment.

7. A system comprising:
   a memory storing an artificial neural network model; and
   a processor configured to:
      train, at a base computer, an artificial neural network to update one or more of a plurality of parameters of the artificial neural network model on the base computer, wherein the plurality of the parameters includes a first parameter and a second parameter;
      compare a first current value of the first parameter from a current training iteration to a first prior value of the first parameter from a prior training iteration and a second current value of the second parameter from the current training iteration to a second prior value of the second parameter from the prior training iteration;
      determine to transmit the first current value of the first parameter to a remote device, based at least in part on a comparison of the first current value of the first parameter and the first prior value of the first parameter, wherein a change between the first current value and the first prior value of the first parameter is more than a threshold value;
      determine to not transmit the second current value of the second parameter to the remote device based at least in part on comparing the second current value of the second parameter and the second prior value of the second parameter, wherein a different change between the second current value and the second prior value of the second parameter is less than the threshold value; and
      transmit the first current value of the first parameter to the remote device to update the first parameter of a version of the artificial neural network model that is implemented on the remote device but is not trained by the remoted device.

8. The system of claim 7, wherein the processor is further configured to determine to transmit the first current value of the first parameter to the remote device based on determining a qualitative or quantitative measure over time of learning by the version of the artificial neural network model on the remote device.

9. The system of claim 7, wherein the threshold value is a fixed value.

10. The system of claim 7, wherein the threshold value is a changing value.

11. The system of claim 7, wherein the artificial neural network model is a deep neural network, a convolutional neural network, or a deep belief network.

12. The system of claim 7, wherein the processor is located in a cloud computing environment.

13. A computer program product comprising:
a storage medium, readable by a processing circuit, storing program instructions for execution by the processing circuit for performing a method comprising:
training, at a base computer, an artificial neural network to update one or more of a plurality of parameters of the artificial neural network model on the base computer, wherein the plurality of parameters includes a first parameter and a second parameter;
comparing a first current value of the first parameter from a current training iteration to a first prior value of the first parameter from a prior training iteration and a second current value of the second parameter from the current training iteration to a second prior value of the second parameter from the prior training iteration;
determining to transmit the first current value of the first parameter to a remote device, based at least in part on comparing the first current value of the first parameter and the first prior value of the first parameter, wherein a change between the first current value and the first prior value of the first parameter is more than a threshold value;
determining to not transmit the second current value of the second parameter to the remote device based at least in part on comparing the second current value of the second parameter and the second prior value of the second parameter, wherein a different change between the second current value and the second prior value of the second parameter is less than the threshold value; and
transmitting the first current value of the first parameter to the remote device to update the first parameter of a version of the artificial neural network model that is implemented on the remote device but is not trained by the remote device.

14. The computer program product of claim 13, wherein determining to transmit the first current value of the first parameter to the remote device further comprises determining a qualitative or quantitative measure over time of learning by the version of the artificial neural network model on the remote device.

15. The computer program product of claim 13, wherein the threshold value is a fixed value or a changing value.

16. The computer program product of claim 13, wherein the artificial neural network model is a deep neural network, a convolutional neural network, or a deep belief network.

17. The computer program product of claim 13, wherein the processing circuit and the storage medium are located in a cloud computing environment.

* * * * *